(12) United States Patent
Rachlin et al.

(10) Patent No.: US 8,627,483 B2
(45) Date of Patent: Jan. 7, 2014

(54) DATA ANONYMIZATION BASED ON GUESSING ANONYMITY

(75) Inventors: Yaron Rachlin, Chicago, IL (US); Katherine Probst, Atlanta, GA (US); Rayid Ghani, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1074 days.

(21) Appl. No.: 12/338,483

(22) Filed: Dec. 18, 2008

(65) Prior Publication Data

US 2010/0162402 A1 Jun. 24, 2010

(51) Int. Cl.
*G06F 7/04* (2006.01)

(52) U.S. Cl.
USPC .................. 726/26; 726/27; 726/28; 726/29; 726/30; 705/50; 705/51

(58) Field of Classification Search
USPC .......................................... 705/26, 30, 50, 51
See application file for complete search history.

(56) References Cited

U.S. PATENT DOCUMENTS

| | | | | |
|---|---|---|---|---|
| 6,037,987 A * | 3/2000 | Sethuraman | ............. | 375/240.03 |
| 6,253,203 B1 * | 6/2001 | O'Flaherty et al. | .................... | 1/1 |
| 6,504,935 B1 * | 1/2003 | Jackson | ........................... | 381/61 |
| 6,618,721 B1 | 9/2003 | Lee | | |
| 7,058,638 B2 * | 6/2006 | Singh | ............................ | 707/757 |
| 7,363,299 B2 * | 4/2008 | Dalvi et al. | ............................ | 1/1 |
| 7,606,788 B2 * | 10/2009 | Samar | .................................... | 1/1 |
| 7,620,940 B2 | 11/2009 | Goldsmith et al. | | |
| 7,698,250 B2 * | 4/2010 | Dwork et al. | ................. | 707/687 |
| 7,716,592 B2 * | 5/2010 | Tien et al. | ..................... | 715/744 |
| 7,769,707 B2 * | 8/2010 | Dwork et al. | ......................... | 1/1 |
| 7,818,335 B2 * | 10/2010 | Dwork et al. | ................. | 707/769 |
| 7,925,617 B2 * | 4/2011 | Mishra | ........................ | 707/601 |
| 7,934,190 B1 * | 4/2011 | Allen et al. | .................... | 716/132 |
| 7,971,131 B1 * | 6/2011 | Ordentilch et al. | ........... | 714/786 |
| 8,005,821 B2 * | 8/2011 | Dwork et al. | ................. | 707/718 |
| 8,051,033 B2 * | 11/2011 | Kenedy et al. | ................ | 707/603 |
| 8,170,507 B2 * | 5/2012 | Wang et al. | ................ | 455/114.3 |
| 2002/0169793 A1 * | 11/2002 | Sweeney | ........................ | 707/204 |
| 2002/0176494 A1 * | 11/2002 | Zhao et al. | ..................... | 375/240 |
| 2003/0124999 A1 * | 7/2003 | Parssinen et al. | .......... | 455/226.1 |
| 2003/0161550 A1 * | 8/2003 | Cheng et al. | .................. | 382/291 |
| 2003/0215092 A1 | 11/2003 | Dick | | |

(Continued)

OTHER PUBLICATIONS

Atzori et al. "Anonymity preserving pattern discovery" Springer-Verlag 2006.*

(Continued)

*Primary Examiner* — Mamon Obeid
(74) *Attorney, Agent, or Firm* — Harrity & Harrity, LLP (57) ABSTRACT

Privacy is defined in the context of a guessing game based on the so-called guessing inequality. The privacy of a sanitized record, i.e., guessing anonymity, is defined by the number of guesses an attacker needs to correctly guess an original record used to generate a sanitized record. Using this definition, optimization problems are formulated that optimize a second anonymization parameter (privacy or data distortion) given constraints on a first anonymization parameter (data distortion or privacy, respectively). Optimization is performed across a spectrum of possible values for at least one noise parameter within a noise model. Noise is then generated based on the noise parameter value(s) and applied to the data, which may comprise real and/or categorical data. Prior to anonymization, the data may have identifiers suppressed, whereas outlier data values in the noise perturbed data may be likewise modified to further ensure privacy.

24 Claims, 4 Drawing Sheets

(56) References Cited

U.S. PATENT DOCUMENTS

| | | | |
|---|---|---|---|
| 2004/0049517 A1* | 3/2004 | Singh .......................... | 707/102 |
| 2006/0059189 A1 | 3/2006 | Dunki et al. | |
| 2006/0123462 A1* | 6/2006 | Lunt et al. ........................ | 726/1 |
| 2007/0083493 A1* | 4/2007 | Dwork et al. ..................... | 707/3 |
| 2007/0130147 A1* | 6/2007 | Dwork et al. ..................... | 707/9 |
| 2007/0136027 A1* | 6/2007 | Dwork et al. ................ | 702/180 |
| 2007/0143289 A1* | 6/2007 | Dwork et al. ..................... | 707/9 |
| 2007/0146631 A1* | 6/2007 | Sinclair et al. ................ | 351/200 |
| 2007/0256061 A1* | 11/2007 | Victorov ....................... | 717/141 |
| 2008/0209568 A1* | 8/2008 | Chang et al. .................... | 726/26 |
| 2008/0275900 A1 | 11/2008 | Zurek | |
| 2009/0254971 A1* | 10/2009 | Herz et al. ........................ | 726/1 |
| 2010/0024045 A1* | 1/2010 | Sastry et al. ..................... | 726/28 |
| 2010/0329490 A1* | 12/2010 | Van Schijndel et al. ...... | 381/314 |
| 2011/0041184 A1* | 2/2011 | Cormode et al. .............. | 726/26 |
| 2011/0052087 A1* | 3/2011 | Mukherjee .................... | 382/248 |
| 2011/0119661 A1 | 5/2011 | Agrawal et al. | |
| 2011/0231661 A1* | 9/2011 | Ramakrishnan et al. ..... | 713/171 |

OTHER PUBLICATIONS

Arikan et al. "Guessing Subject to Distortion" IEEE May 1998.*
Liu et al. "Wavelet-Based Data Distortion for Simultaneous Privacy-Preserving and Statistics-Preserving" May 25, 2008.*
"Globalization and Offshoring of Software", Aspray, Mayades & Vardi, ACM, 2006.
"ASM: a code manipulation tool to implement adaptable systems", Bruneton, Lenglet & Coupaye, In Proc. ACM SIGOPS, France, Nov. 2002.
"KLEE: Unassisted and automatic generation of high-coverage tests for complex systems programs", Cadar, Dunbar & Engler, In Proc. 8th USENIX OSDI, pp. 209-224, USENIX, Dec. 2008.
"Better bug reporting with better privacy", Castro, Costa & Martin, In Proc. 13th ASPLOS, pp. 319-328, ACM, Mar. 2008.
"Dytan: a generic dynamic taint analysis framework", Clause, Li & Orso, in ISSTA '07, pp. 196-206, New York NY USA 2007, ACM.
"Automatic program transformation with Joie", Cohen, Chase and Kaminsky, in Proc. USENIX Annual Technical Symposium, pp. 167-178, USENIX, Jun. 1998.
"Anonymized data: generation, models, usage", Cormode & Srivastava, In Proc 35th ACM ISGMOD, pp. 1016-1018, ACM 2009.
"DySy: Dynamic symbolic execution for invariant inference", Csallner, Tillmann, and Smaragdakis, in Proc. 30th ACM/IEEE ICSE, pp. 281-290, ACM, May 2008.
"Oracles for checking temporal properties of concurrent systems", Dillon and Yu, In ACM SIGSOFT '94, pp. 140-153, Dec. 1994.
"Dynamic test input generation for database applications", Emmi, Majumdar and Sen, In ISSTA, pp. 151-162, 2007.
"Dart: Directed automated random testing", Godefroid, Klarlund and Sen, In Proc. ACM SIGPLAN PLDI, pp. 213, 223, ACM, Jun. 2005.
"A Methodology for Controling the size of a test suite", Harrold, Gupta, and Soffa, ACM Trans. Softw. Eng. Methodol., 2(3):270-285, Jul. 1993.
IBM: Optim Integrated Data Management, http://www-01.ibm.com/software/data/data-management/optim-solutions.
"A family of test adequacy criteria for database-driven applications", Kapfhammer and Soffa, In Proc. 11th ACM SIGSOFT FSE, pp. 98-107, ACM, 2003.
"A History-based test prioritization technique for regression testing in resource constrained environments", Kim and Porter, In ICSE, pp. 119-129, 2002.
"Undecidability of static analysis", Landi, ACM Lett. Program. Lang. Syt. 1(4):323-337, 1992.
"Mondrian multidimensional k-anonymity", LeFebre, DeWitt, Ramakrishnan, In Proc. 22nd ICDE, p. 25, IEEE, 2006.
"Attribute selection in multivariate microaggregation", Nin, Herranz, and Torra, In Proc. PAIS, pp. 51-60, ACM, 2008.
"Generating a test oracle from program documentation: work in progress" Peters and Parnas, In ISSTA '94, pp. 58-65, New York NY USA, 1994, ACM Press.
"Chianti: a tool for change impact analysis of java programs", Ren, Shah, Tip, Ryder and Chesley, In OOPSLA, pp. 432-448, 2004.
"Taos: Testing with Analysis and Oracle Support", Richardson, In ISSTA '94: Proceedings of the 1994 ACM SIGSOFT ISSTA, pp. 138-153, New York NY USA, 1994, ACM Press.
"Specification-based Test Oracles for Reactive Systems", Richardson, Leif-Aha, O'Malley, In Proceedings of the 14th ICSE, pp. 105-118, May 1992.
"Protecting respondents' identities in a microdata release", Samarati, IEEE Trans. Knowl., Data Eng., 13(6), 1010-1027, 2001.
"Test-suite augmentation for evolving software", Santelices, Chittimali, Apiwattanapong, Orso and Harrold, In ASE, pp. 218-227, 2008.
"Cute and jCute: Concolic unit testing and explicit path model-checking tools", Sen and Agha, In Proc. CAV, pp. 419-428, Springer, Aug. 2006.
"k-Anonymity: A model for protecting privacy", Sweeney, International Journal of Uncertainty, Fuzziness and Knowledge-based Systems, 10(5): 557-570, 2002.
"Software unit test coverage and adequacy", Zhu, Hall and May, ACM Compu. Surv. 2(4): 366-427, 1997.
"A Quantitative Comparison of Disclosure Control Methods for Microdata", Domingo-Ferrer & Tora, Confidentiality, Disclosure, and Data Access: Theory and Practical Applications for Statistical Agencies, Elsevier, pp. 111-133 (2001).
"Estimating the re-identification risk per record in microdata", Skinner, et al., Journal of Official Statistics, Statistics Sweden, Stockholm SE, vol. 14, No. 4, 1998, pp. 361-372, XP002974205.
"Protecting patient privacy by quantifiable control of disclosures in disseminated databases", Ohno-Machado, et al., International Journal of Medical Informatics, Elsevier Scientific Publishers, Shannon, Ireland, vol. 73, No. 7-8, Aug. 2004, pp. 599-606, XP004521015.
International Search Report for PCT/EP2008/050908 issued on Apr. 7, 2008 (PCT/ISA 210).
"An Inequality on Guessing and its Application to Sequential Decoding", Erdal Arikan, IEEE Transactions on Information Theory, vol. 42, No. 1, Jan. 1996.
"Maximizing Privacy Under Data Distortion Constraints in Noise Perturbation Methods", Rachlin, Probst, Ghani, Presented at: 2nd ACM SIGKDD International Workshop on Privacy, Security and Trust in KDD (PinKDD), Aug. 24, 2008.
"Security-control Methods for Statistical Databases", N. R. Adam and J.C. Wortman, ACM Computing Surveys, 21(4), 1989.
"On Randomization, Public Information, and the Curse of Dimensionality", C.C. Aggarwal, IEEE International Conference on Data Engineering, 2007.
"On Unifying Privacy and Uncertain Data Models", C.C. Aggarwal, IEEE International Conference on Data Engineering, 2008.
"Privacy-preserving Data Mining", R. Agrawal and R. Srikant, SIGMOD Rec., 29(2) 2000.
"A Face is Exposed for AOL Searcher No. 4417749", M. Barbaro and T. Zeller, New York Times, Aug. 9, 2006.
"Data Privacy Through Optimal K-Anonymization", R.J. Bayardo and R. Agrawal, pp. 217-228, 2005.
"Finding a Needle in a Haystack—or Identifying Anonymous Census Record", T. Dalenius, J. Official Statistics, 2(3) 329-336, 1986.
"On the Privacy Preserving Properties of Random Data Perturbation Techniques", H. Kargupta, S. Datta, Q. Wang and K. Sivakumar, in ICDM, 2003.
"Incognito: Efficient Full-Domain K-Anonymity", K. LeFevre, D.J. DeWitt, and R. Ramakrishnan, SIGMOD, 2005.
"Guessing and Entropy", J.L. Massey, in IEEE Symposium on Information Theory, 1994.
"Security of Random Data Perturbation Methods", K. Muralidhar and R. Sarathy, ACM Trans. Database Syst., 24(4), 1999.
"On Measures of Entropy and Information", A. Renyi, in 4th Berkeley Symposium on Mathematical Statistics and Probability, 1961.
"Protecting Privacy when Disclosing Information: K-Anonymity and Its Enforcement Through Generalization and Suppression", P. Samarati and L. Sweeney, in Proceedings of the IEEE Symposium on Research in Security and Privacy, 1998.
"Achieving K-Anonymity Privacy Protection Using Generalization and Suppression", L. Sweeney, International Journal on Uncertainty, Fuzziness and Knowledge-based Systems, 10(5) 571-588, 2002.
IBM Corporation, "Optim Integrated Data Management", http://www.01.ibm.com/software/data/data-management/optim-solutions, 1 page, Aug. 12, 2010 (print date).

* cited by examiner

| NAME | AGE | PROCEDURE / PRESCRIPTION |
|---|---|---|
| ALICE | 19 | ANTIDEPRESSANTS |
| BOB | 15 | ANTIBIOTICS |
| CHRIS | 52 | CHEMOTHERAPY |
| DIANE | 25 | ABORTION |

FIG. 6

| NAME | AGE | PROCEDURE / PRESCRIPTION | GUESSING ANONYMITY |
|---|---|---|---|
| *** | 23.1 | ANTIDEPRESSANTS | 2 |
| *** | 19.4 | ANTIBIOTICS | 2 |
| *** | 49.3 | CHEMOTHERAPY | 1 |
| *** | 21.1 | ABORTION | 2 |

FIG. 7

| NAME | AGE | PROCEDURE / PRESCRIPTION |
|---|---|---|
| ALICE | 19 | ??? |
| CHRIS | 52 | ??? |

FIG. 8

DATA ANONYMIZATION BASED ON GUESSING ANONYMITY

FIELD OF THE INVENTION

The instant disclosure relates generally to data anonymization and, in particular, to a technique for balancing privacy and data distortion using randomization techniques based on guessing anonymity.

BACKGROUND OF THE INVENTION

Valuable research, whether in an academic or business context, is often dependent on the availability of large quantities of structured data (e.g., data corresponding to various entities that are grouped together and that share common attributes, and where the data is organized according a defined schema) for data mining and other analyses. However, such data often includes personal information about individuals that should not be disclosed. The tension between protecting privacy and preserving data utility is a fundamental problem for organizations that would like to share their data. Where this problem is not resolved, data is either not shared, preventing useful applications, or organizations adopt risky practices of disclosing private information, sometimes with unfortunate results. One approach to this problem is to "sanitize" the data by modifying any data that may be used to identify individuals in such a way that it becomes difficult for an adversary to associate any given record with a specific individual.

Most practical approaches to sanitizing data can be grouped into two large categories, algorithms based on so-called K-anonymity and randomization (the latter being often referred to as noise perturbation). K-anonymity approaches modify any potentially identifying information in such a way that a given individual's record cannot be distinguished from at least k other records in the structured data. While such techniques achieve a desired level of privacy, K-anonymity based tradeoffs between privacy and distortion inevitably reduce to difficult combinatorial optimization problems. Additionally, due to the use of generalization and suppression operators, the output of K-anonymization is data with a changed representation (e.g., zip codes with digits removed or deleted attributes), thereby complicating the construction of models that will be applied to clean data, or running test code which must now be altered to run on the altered data. Further still, the statistical effect of a K-anonymity anonymization process is not clear, thereby making data analysis challenging.

In randomization, the structured data is corrupted by noise in an effort to conceal specific data values. An advantage of randomization is that the noise can be chosen with statistical properties (which properties may be subsequently published) such that aggregate queries against the structured data can account for the added noise, thereby increasing the accuracy and reliability of the aggregate results without compromising individual privacy. Furthermore, representation of the data is preserved (e.g. an age is mapped to a specific number, as opposed to an age range in the case of k-anonymity-based approaches). However, while randomization (using current techniques) preserves utility of the data, it cannot make assurances concerning the privacy level of the published data.

Figure 6:
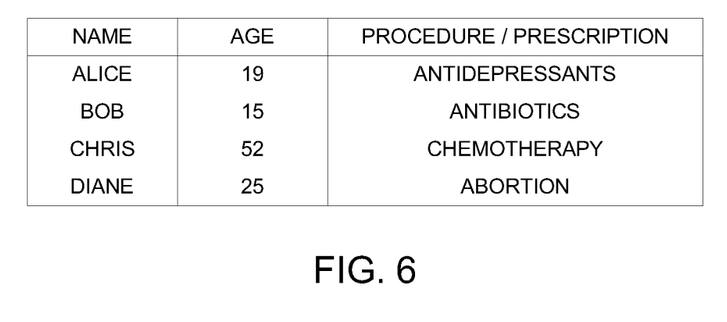
FIG. 6 illustrates an example of structured data.
Figure 7:
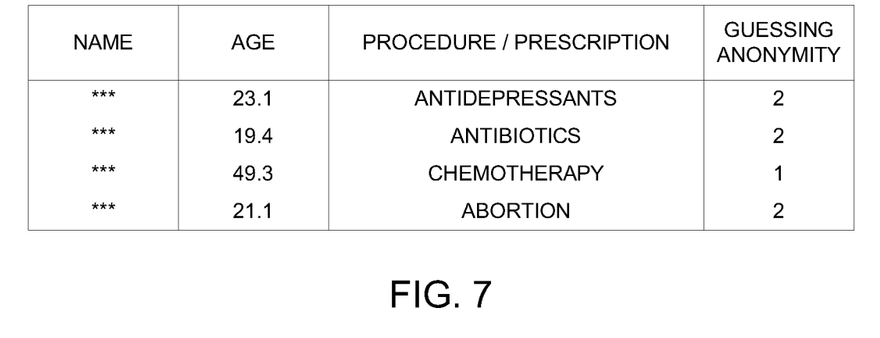
FIG. 7 illustrates a sanitized or anonymized version of the structured data of FIG. 6.
Figure 8:
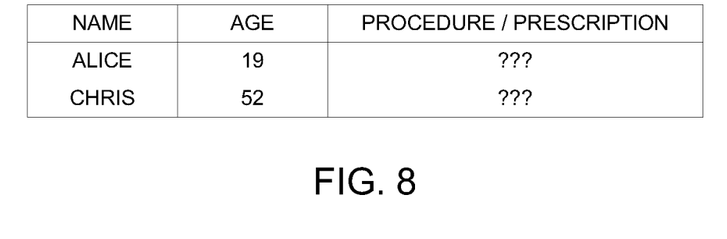
FIG. 8 illustrates an example of publicly available data that may be used in a linking attack against the sanitized data of FIG. 7.

Indeed, in some cases, it may be possible to attack randomized structured data based on publicly available information to associate specific records with specific individuals, i.e., a linking attack. An example of this is illustrated in FIGS. 6-8. FIG. 6 illustrates structured data comprising a name, age and procedure/prescription attribute for each record prior to anonymization. As shown in FIG. 7, in order to preserve anonymity of each individual listed in the records, the name attribute is removed completely whereas the age attribute is perturbed by random noise to provide sanitized data. FIG. 8 illustrates publicly available information about two of the individuals, namely their name and age. In the linking attack, the attacker attempts to associate some attributes from the publicly available information with the same attributes in the sanitized data. In the illustrated example, the attacker can note that Chris' age is 52, which matches well with the outlier age value in FIG. 7 of 49.3 when compared with the other sanitized age values. As a result, the attacker can infer that Chris is associated with the third record (i.e., the one listing chemotherapy as the procedure/prescription).

Thus, it would be advantageous to provide techniques that provide the ability to balance and control privacy versus distortion performance when anonymizing structured data, thereby preserving utility of the data while simultaneously providing a known level of privacy.

SUMMARY OF THE INVENTION

The instant disclosure describes methods and apparatus for data anonymization based on noise perturbation or randomization while providing assurances concerning the privacy level of the published data. To this end, a definition of privacy for noise perturbation methods is provided to address the problem of identity linking using publicly available information. In particular, privacy is defined in the context of a guessing game based on the so-called guessing inequality. The privacy of a sanitized record, i.e., the guessing anonymity, is defined by the number of guesses an attacker needs to correctly guess the original record used to generate the sanitized record. Using this definition, optimization problems are formulated that optimize a second anonymization parameter (privacy or data distortion) given constraints on a first anonymization parameter (data distortion or privacy, respectively). Optimization is performed across a spectrum of possible values for a noise parameter within a noise model. Thus, if the expected guessing anonymity is constrained to a minimum level (i.e., at least X degree of privacy will be provided), a noise parameter value is found that minimizes the distortion (i.e., noise) to be applied to the data in order to achieve the selected minimum level of privacy. Oppositely, if the expected distortion is constrained to a maximum level (i.e., no more than Y level of distortion will be applied to the data), a noise parameter value is found that maximizes the guessing anonymity for the data without exceeding the selected maximum distortion level. Advantageously, this technique may be applied to either real or categorical data. Prior to anonymization, the structured data may have identifiers suppressed, whereas outlier data values in the noise perturbed data (i.e., the structured data after application of the noise) may be likewise modified to further ensure privacy. Data anonymized in this fashion may be provided to third parties as desired. In this manner, the techniques described herein provide greater control over the anonymization process while preserving utility of the structured data.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
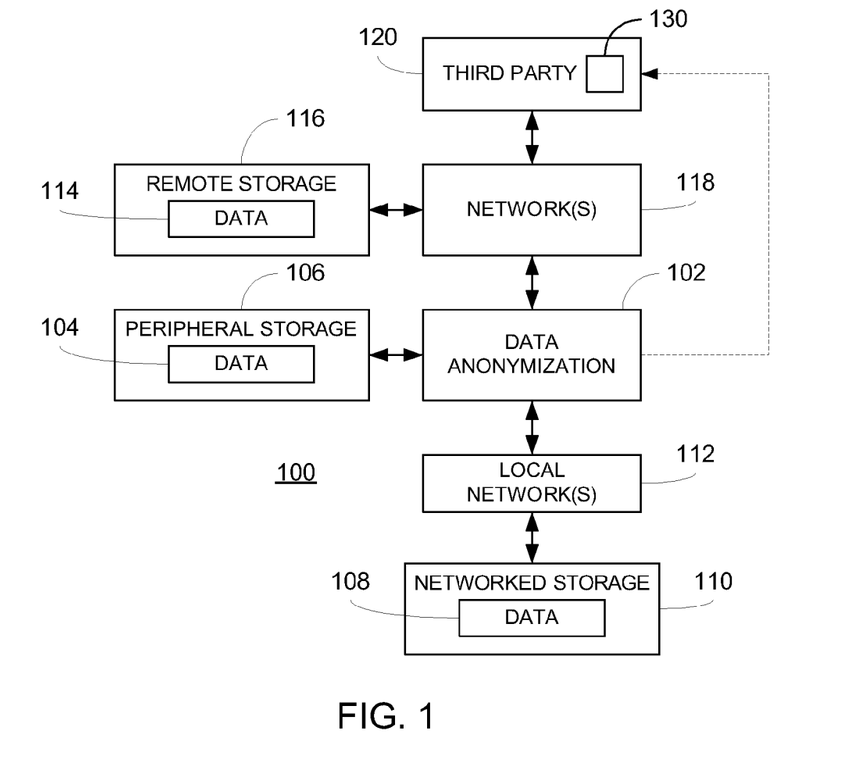
FIG. 1 is a block diagram of a system in accordance with the teachings of the instant disclosure.

Referring now to FIG. 1 a system 100 is illustrated comprising a data anonymization device 102 in communication with a third party 120 via one or more intervening networks 118. As described in greater detail below, the data anonymization device 102 may comprise a desktop or laptop computer, a server computer or similar devices as known in the art. Similarly, the third party 120 may likewise comprise processing devices located at a place of business, research organization or other institution interested in receiving anonymized structured data. Although a single third party 120 is shown for ease of illustration, it is understood that multiple such third parties may exist in any implementation. The network(s) 106 may comprise a public network (e.g., the Internet, World Wide Web, etc.) or private network (e.g., local area network (LAN), etc.) or combinations thereof (e.g., a virtual private network, LAN connected to the Internet, etc.). Furthermore, the network 106 need not be a wired network only, and may comprise wireless network elements as known in the art. In one embodiment, the data anonymizing device 102 provides noise perturbed data (i.e., sanitized or anonymized structured data) to the third party 120 in an electronic (typically digital) format via the network(s) 118. However, as illustrated by the dotted line, the data anonymizing device 102 can also provide the noise perturbed data directly to the third party 120 via other media, such as suitable storage devices including, but not limited to, magnetic or optical storage media.

As described in greater detail below, the data anonymization device 102 operates upon structured data that that may be provided to the data anonymization device 102 from any of a number of sources. For example, the data anonymization device 102 may receive data 104 to be anonymized from a peripheral storage device 120 (e.g., external hard drives, optical or magnetic drives, etc.) associated with the data anonymization device 102. Alternatively, the data anonymization device 102 may be in communication with locally networked storage 110 having stored thereon the data 108 to be anonymized. Further still, the data 114 may be stored in remote storage 116 that is accessible through the use of a suitable network address, as known in the art. In the latter two examples, in particular, the storage 110, 116 may be embodied as suitably configured database servers. Note that the entity operating the data anonymization device 102 may be the owner or controlling party of one or more of the various storages 106, 110, 116, or may comprise an entity providing data anonymization services to data owners. Regardless, as these non-exhaustive examples illustrate, the instant disclosure is not limited in the manner in which the data to be analyzed is stored and/or provided to the data anonymization device 102.

In an alternative embodiment, the anonymization function provided by the data anonymization device 102 may be provided through an application interface. For example, as shown in FIG. 1, a data anonymization application 130 may be provided that allows a user to invoke data anonymization processing described in greater detail below. For example, the application 130 may comprise a database or spreadsheet application, a text editor application, etc. as known in the art, in which the below-described data anonymization functionality may be invoked through activation of an appropriate user input mechanism, e.g., a button, menu selection or other widget provided via a graphical user interface or the like. For instance, an "Export Anonymized Data" or "Import Anonymized Data" function may be provided such that a user of the application is able to send data currently available to the application to a desired location (e.g., storage, another user, etc.) in an anonymized fashion, or to make otherwise un-anonymized data available to the application in an anonymized fashion. In these cases, the data source (or destination) may likewise be specified via user inputs. Techniques for incorporating such functionality into applications are well known to those having ordinary skill in the art.

Figure 2:
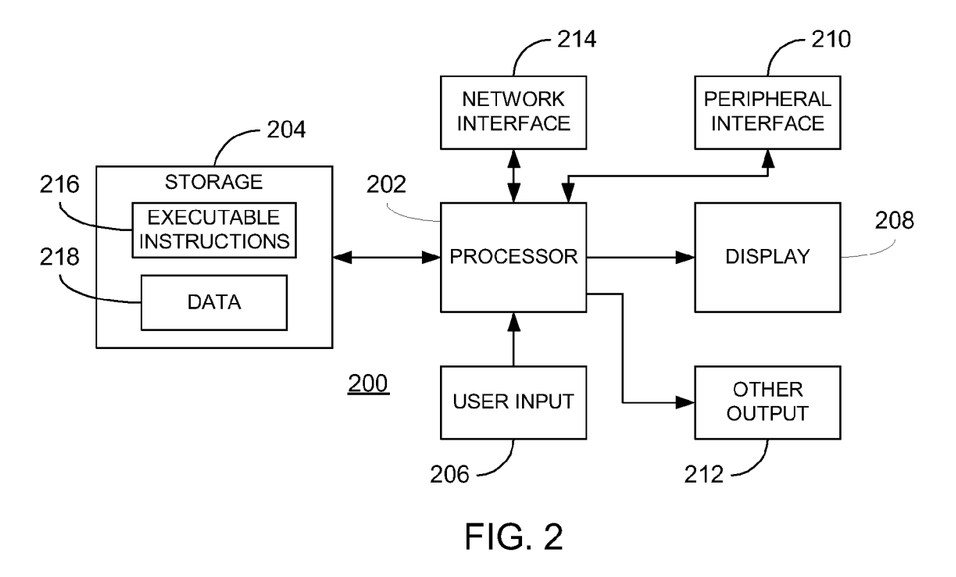
FIG. 2 is a block diagram of an apparatus the may be used to implement the various techniques described herein.

FIG. 2 illustrates an exemplary processing device 200 that may be used to implement the teachings of the instant disclosure. With reference once again to FIG. 1, the device 200 may be used to implement, for example, the data anonymization device 102. Regardless, the device 200 comprises a processor 202 coupled to a storage component 204. The storage component 204, in turn, comprises stored executable instructions 216 and data 218. In an embodiment, the processor 202 may comprise one or more processing devices such as a microprocessor, microcontroller, digital signal processor, or combinations thereof capable of executing the stored instructions 216 and operating upon the stored data 218. Likewise, the storage 204 may comprise one or more devices such as volatile or nonvolatile memory including but not limited to random access memory (RAM) or read only memory (ROM). Processor and storage arrangements of the types illustrated in FIG. 2 are well known to those having ordinary skill in the art. In a presently preferred embodiment, the processing techniques described herein are implemented as a combination of executable instructions and data within the storage component 204.

In a presently preferred embodiment, the device 200 may comprise one or more user input devices 206, a display 208, a peripheral interface 210, other output devices 212 and a network interface 214 in communication with the processor 202 as shown. The user input device 206 may comprise any mechanism for providing user input (such as inputs specifying noise models, desired anonymization parameter levels, etc. as described below) to the processor 202. For example, the user input device 206 may comprise a keyboard, a mouse, a touch screen, microphone and suitable voice recognition application or any other means whereby a user of the device 200 may provide input data to the processor 202. The display 208, may comprise any conventional display mechanism such as a cathode ray tube (CRT), flat panel display, or any other display mechanism known to those having ordinary skill in the art. The peripheral interface 210 may include the hardware, firmware and/or software necessary for communication with various peripheral devices, such as media drives (e.g., magnetic disk or optical disk drives) or any other source of input used in connection with the instant techniques. Note that, as known in the art, such media drives may be used to read storage media comprising the executable instructions used to implement, in one embodiment, the various techniques described herein. Likewise, the other output device(s) 212 may optionally comprise similar media drive mechanisms as well as other devices capable of providing information to a user of the device 200, such as speakers, LEDs, tactile outputs, etc. Finally, the network interface 214 may comprise hardware, firmware and/or software that allows the processor 202 to communicate with other devices via wired or wireless networks, whether local or wide area, private or public, as known in the art.

While the device 200 has been described as a one form for implementing the techniques described herein, those having ordinary skill in the art will appreciate that other, functionally equivalent techniques may be equally employed. For example, as known in the art, some or all of the executable instruction-implemented functionality may be implemented using firmware and/or hardware devices such as application specific integrated circuits (ASICs), programmable logic arrays, state machines, etc. Further still, other implementations of the device 200 may include a greater or lesser number of components than those illustrated. Once again, those of ordinary skill in the art will appreciate the wide number of variations that may be used is this manner.

Figure 3:
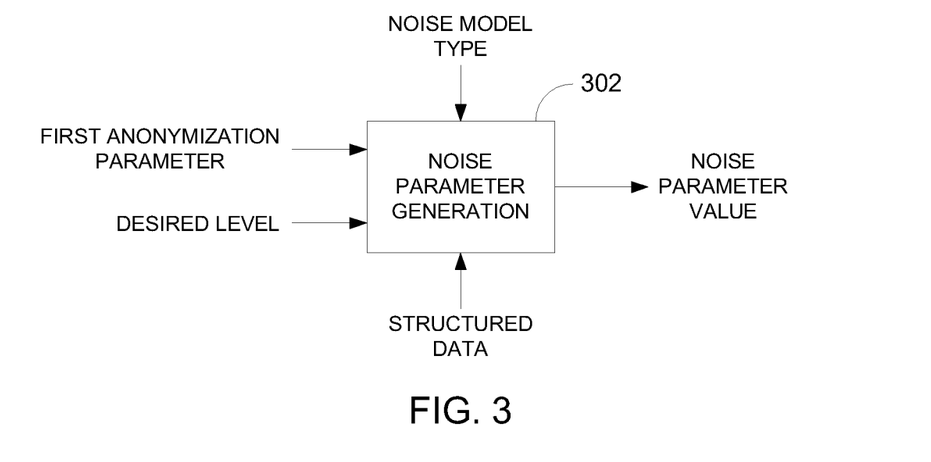
FIG. 3 is a block diagram of another apparatus in accordance with the teachings of the instant disclosure.
Figure 4:
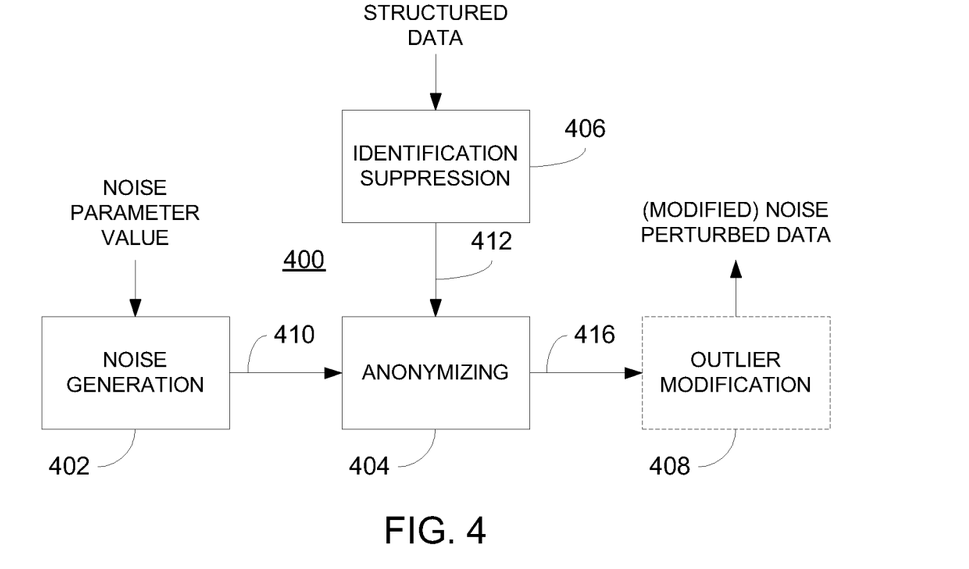
FIG. 4 is a block diagram of yet another apparatus in accordance with the teachings of the instant disclosure.

Referring now to FIGS. 3 and 4, apparatus 302, 400 that may be used to implement the techniques described herein are illustrated. Preferably, the device 200 of FIG. 2 is used to implement the apparatus 302, 400 in the form of stored instructions executed by one or more processors. However, as noted above, the various other functionally equivalent techniques may be equally employed for this purpose. Furthermore, as noted above, the apparatus 302, 400 may be implemented in a centralized (e.g., data anonymization device 102) or distributed (e.g., data anonymization application 130) manner. Typically, the apparatus 302, 400 are implemented in a single device, but are illustrated separately to highlight the separate types of processing done by each. More particularly, the apparatus 302, 400 implement a randomization technique based on the concept of guessing anonymity. Given a database of records (or structured data) and a sanitized version of this database, the guessing anonymity of a sanitized record may be generally defined as the number of guesses that an optimal attacker requires to link this sanitized record to a specific individual or entity using publicly available data.

More formally, consider a structured database having M records, such as that illustrated in FIG. 6. As shown this databases has four records, each with three attributes; a name attribute, an age attribute and a procedure/prescription attribute. The name attribute, which would completely identify an individual, is an identifier. The age attribute is a quasi-identifier, since such an attribute can be compared with external information sources to identify an individual in the database. The procedure/prescription attribute is confidential because it contains sensitive information that is not assumed to be publicly available. As noted above, the quasi-identifiers may be used for a linking attack, but also include useful information that may be important to a given area of inquiry. The quasi-identifiers associated with the record i are denoted $r_i$ where i=1 to M and corresponds to some individual or entity. Each $r_i$ is an N-dimensional vector, N≤M, whose elements can be either real or categorical values corresponding to N-different attributes. A real attribute may have any of a large possible range of typically numeric values, e.g., age, account balance, etc. A categorical attribute may have any of a relatively small number of values, typically each corresponding to a specific category value or label, e.g., employment status (yes, no), marital status (single, married, divorced, widowed), etc. When sanitizing a record, identifiers are typically suppressed (i.e., deleted or at least modified as to be incapable of identifying an individual) and the confidential attributes are preserved. The quasi-identifiers, $r_i$, of record i are sanitized via noise perturbation and released as s (along with the unchanged sensitive information).

As used herein, privacy is modeled by quantifying the difficulty of linking the quasi-identifiers of a sanitized record s with the true quasi-identifiers of the record from which it was generated using publicly available information. As noted above, noise perturbation is used to sanitize the quasi-identifiers; that is, s is sampled from the distribution $P_{S|I}$ where I is a random variable indicating record $r_I$ and the probability of drawing sanitized record s for record $r_I$ is $P_{S|I}$ (S=s|I=i). The sanitized version of the structured data shown in FIG. 6 is illustrated in FIG. 7. For each record, the age attribute in FIG. 6 is independently corrupted using additive zero mean Gaussian noise to obtain the age values in FIG. 7. In this example, $P_{S|I}$ is a Gaussian centered at the age associated with the record, and s is sampled from this distribution.

Given a released record s, the difficulty of linking it with a true record may be quantified by first defining a guessing strategy as a sequence of questions of the form "Is $r_I$ the vector of quasi-identifiers used to generate s?" The guessing function G is defined as a function of the sanitized quasi-identifiers s, such that for each s, G(•, s) denotes the number of guesses required to guess $r_i$ when an attacker observes s. The optimal guessing strategy is the strategy that minimizes the expected value of the guessing function, i.e., $E_{IS}$ [G(I|S)]. As known in the art, the optimal strategy is one that proceeds in the decreasing order of the probability of $r_i$ for any given sanitized record s. Thus, more formally, the guessing anonymity of the sanitized record s is the number of guesses that the optimal guessing strategy requires in order to correctly guess the record used to generate the sanitized record.

This concept of guessing anonymity may be further illustrated with reference to the linking attack example described above with reference to FIGS. 6-8. In particular, the guessing anonymity of each record is shown in the fourth column of FIG. 7. While the record corresponding to Alice has a guessing anonymity of two, the sanitized record corresponding to Chris has a guessing anonymity of one due to the fact that his age is significantly higher than the ages in the other records. To protect the anonymity of Chris' record, a Gaussian with a larger variance should have been used to sanitize his record. Intuitively, the guessing anonymity of a record quantifies the difficulty of using the sanitized record to perform some attack.

With this background, it is worth noting the more recent development of k-randomization (as distinguished from k-anonymity or randomization as described above). A record is k-randomized if the number of invalid records that are a more likely match to the sanitized record than the original record is at least k. Though defined in similar terms, k-randomization differs from guessing anonymity to the extent that guessing anonymity does not provide a lower limit on the number of invalid records that provide a more likely match, and that guessing anonymity explicitly establishes a connection between privacy and guessing functions, as described in further detail below. Even more recently, probabilistic k-anonymity was introduced. A record is probabilistically k-anonymized if the expected number of invalid records that are a more likely match to the sanitized record than the true record is at least k. Note that this definition differs from the definition of guessing anonymity for reasons similar to k-randomization.

An advantage of the definition of guessing anonymity is that it permits exploitation of an analytical relationship between perturbation noise and anonymity based on the application of the guessing inequality. In the context of the instant disclosure, the guessing inequality may be written as:

$$H_\alpha(I|S) - \log(1 + \ln(M)) \le \frac{1}{\rho}\log\left[\min_G E_{IS}[G(I|S)]^\rho\right] \le H_\alpha(I|S) \quad \text{Eq. 1}$$

The guessing inequality shows that the moments of the guessing function are upper and lower bounded by the conditional Renyi entropy, $H_\alpha$ (I|S), that, as known in the art, expresses the diversity, uncertainty or randomness of a system.

For its first moment (i.e. $\rho=1$), the guessing function may be bounded according to Equation 1 for several different data and noise perturbation models. For example, consider a simple database of M records, where each record is a single real number $r_i$ (e.g., the age attribute in FIG. 6). Using the guessing inequality, the expected number of guesses is bounded when each record is independently perturbed with zero mean Gaussian noise of variance $\sigma^2$, i.e., $$P_{S|I}(s|i) = \frac{1}{\sqrt{2\pi\sigma^2}}e^{-\frac{(s-r_i)^2}{2\sigma^2}} \quad \text{Eq. 2}$$

Since there are M records in the example database $$P_I = \frac{1}{M}.$$

Applying the guessing inequality to this simple model, and defining the constant $$c = \frac{1}{1+\ln(M)}\frac{1}{M}$$

results in:

$$E[G(I|S)] \ge \frac{1}{1+\ln(M)}\int_{-\infty}^{\infty}\left[\sum_{x=1}^{M}P_{SI}(s,i)^{\frac{1}{2}}\right]^2 = \quad \text{Eq. 3}$$

$$c\sum_{i=1}^{M}\sum_{j=1}^{M}e^{-\frac{(r_i-r_j)^2}{8\sigma^2}} = F(\sigma^2)$$

It is noted that the lower bound on the expected number of guesses expressed in Equation 3 depends on the pairwise differences between all the records, thereby demonstrating that the bound relies on the actual values of the data being anonymized. Of equal importance, the guessing inequality provides an analytical connection between privacy, expressed as E[G(I|S)], and the parameters of the noise perturbation model, i.e., $\sigma^2$ in the simple Gaussian model.

Lower bounds for more complex noise and database models may be derived. For example, assume that a database consists of M records each with N attributes, where each record $r_i$ is a vector of real numbers. The expected number of guesses when each attribute k in each record is independently perturbed with additive zero-mean Gaussian noise of variance $\sigma_k^2$ can be lower bounded as follows:

$$E[G(I|S)] \ge c\sum_{i=1}^{M}\sum_{j=1}^{M}\prod_{k=1}^{N}e^{-\frac{(r_{ik}-r_{jk})^2}{8\sigma^2}} \quad \text{Eq. 4}$$

Note that this lower bound reduces to Equation 3 when N=1, i.e., only one real attribute per record. In an even more complex noise model, the expected number of guesses when each attribute k of the quasi-identifiers in record i is independently perturbed with zero mean Gaussian noise of variance $\sigma_{ik}^2$ is lower bounded as follows:

$$E[G(I|S)] \ge c\sum_{i=1}^{M}\sum_{j=1}^{M}\prod_{k=1}^{N}\sqrt{\frac{2\sigma_{ik}\sigma_{jk}}{\sigma_{ik}^2+\sigma_{jk}^2}}e^{-\frac{(r_{ik}-r_{jk})^2}{4(\sigma_{ik}^2+\sigma_{jk}^2)}} \quad \text{Eq. 5}$$

Note that Equation 5 reduces to Equation 4 when the variance is the same across records, i.e. $\sigma_{ik}^2=\sigma_{jk}^2$ for all i, j. In short, the guessing inequality, i.e., the analytical connection between privacy and the parameters of the noise perturbation model, can be computed for increasingly complex noise models for real attributes. Further still, this lower bounding technique also applies to categorical variables.

In categorical data, r and s are drawn from finite sets as noted above. In this case, the noise model may comprise independently perturbing each quasi-identifier, $$P_{S|I}(s|i) = \sum_{k=1}^{N}P_{S_k|I}(s_k|r_{ik})$$

and where $P_{S_k|I}(s_k|r_{ik})=p_{sr}^k$ is a conditional probability distribution specifying transition probabilities from $R_k$ (the finite set from which r is drawn) to $S_k$ (the finite set from which s is drawn). For such a noise model, the guessing inequality may be expressed as:

$$E[G(I|S)] \ge c\sum_{i=1}^{M}\sum_{j=1}^{M}\prod_{k=1}^{N}\sum_{h=1}^{|S_k|}P_{S_k|I}(s_h|r_{ik})^{\frac{1}{2}}P_{S_k|I}(s_h|r_{jk})^{\frac{1}{2}} \quad \text{Eq. 6}$$

In the case of categorical data, the noise parameter(s) as transition probabilities between categorical values. Thus, a probability matrix may be defined with transition possibilities for the various potential value transitions. For example, in transition probability, $P(value_j|value_i)=x$, x specifies the probability that the model will flip from $value_i$ to $value_j$, and the probability matrix may be populated for all desired i, j. Regardless, it is note that, in practice and depending on the number of attributes and records, it may be more computationally efficient to compute Equation 1 directly rather than Equation 6. As in the various examples of Gaussian perturbation described above, note that Equation 6 is a function of the values of the data set being sanitized. Finally, it is noted that a lower bound for mixed categorical and real attributes can be derived, for example, by combining Equations 4 and 6.

As described above, the guessing inequality provides analytical bounds on the expected guessing anonymity (i.e., privacy) of noise-perturbed data for any of a variety of noise models. To exploit this analytical connection, the boundaries derived in this manner may be used to optimize the trade-off between data utility (or, conversely, data distortion) and privacy. Utility can be analyzed by considering the expected distortion between the original N attribute quasi-identifiers r and the noise-perturbed data s. Intuitively, high distortion means low utility, and vice versa. This definition of utility enables us to formulate and solve optimization problems to find the noise parameters that provide the maximum level of privacy given constraints on data distortion.

A distortion function may be generally defined as d. For real valued attributes, consider the mean squared error distortion:

$$d_{MSE}(i,s) = \frac{1}{M}\sum_{i=1}^{M}\sum_{k=1}^{N}(r_{ik} - s_{ik})^2 \quad \text{Eq. 7}$$

For categorical attributes, consider the case where r and s are drawn from equivalent finite sets, i.e., $R_k=S_k$. In this case, the Hamming distortion is defined as:

$$d_H(i,s) = \frac{1}{M}\sum_{i=1}^{M}\sum_{k=1}^{N}I(r_{ik}, s_{ik}) \quad \text{Eq. 8}$$

where $I(r,s)=1$ if $r \neq s$ and 0 otherwise. It is understood that one can define other distortion functions in an application-dependent manner. For example, distortion of some records or attributes can be weighted more heavily in situations where a domain expert assesses that certain attributes are more important than others.

Given the guessing inequality-based bounds on privacy and the appropriate definition of distortion, an optimization problem can be stated whose solutions enables configurable tradeoffs between distortion and privacy:

$$\max_{\substack{\Theta \\ E_{IS}[d(I,S)] \leq C}} (1+\ln(M))^{-1} e^{H_{0.5}(I|S)} \quad \text{Eq. 9}$$

Equation 9 establishes that a first anonymization parameter, in this case expected distortion $d(I, S)$, is constrained to be less than or equal to C, the distortion constraint. While being subject to this constraint, a second anonymization parameter, in this case, privacy expressed as $(1+\ln(M))^{-1}e^{H_{0.5}(I|S)}$, is maximized within the range of feasible noise parameters, $\Theta$, of the noise perturbation model. As a simple example, consider Equation 9 for the case of a database where each record consists of a single real quasi-identifier and a noise perturbation model where each record is independently perturbed using zero mean Gaussian noise with the same variance. Assuming the distortion metric is the mean squared error shown in Equation 7, Equation 9 may now be written as:

$$\max_{\substack{\sigma \\ \sigma^2 \leq C}} F(\sigma^2) \quad \text{Eq. 10}$$

where $F(\sigma^2)$ is defined as in Equation 3. In the optimization problem described above, the first anonymization parameter, expected distortion, is constrained to a desired level while the second anonymization parameter, privacy, is maximized over the resulting range of noise parameters provided by the distortion constraint. It is equally possible to establish a related optimization problem, where the first anonymization parameter is the expected guessing anonymity (privacy) subject to a minimum constraint, whereas the second anonymization parameter, distortion, is minimized over the range of feasible noise parameters. Expressed in similar form to Equation 9, this optimization problem becomes:

$$\min_{\substack{\Theta \\ (1+\ln(M))^{-1}e^{H_{0.5}(I|S)} \geq C}} E_{IS}[d(I,S)] \quad \text{Eq. 11}$$

Assuming once again the simple case of a database where each record consists of a single real quasi-identifier and a noise perturbation model where each record is independently perturbed using zero mean Gaussian noise with the same variance, and the mean squared error distortion metric, Equation 11 may be written as:

$$\max_{\substack{\sigma \\ F(\sigma^2) \geq C}} \sigma^2 \quad \text{Eq. 12}$$

Referring once again to FIG. 3, the noise parameter generation component 302 implements processing based on the optimization problems described above. As shown, the component 302 receives as input, typically from a user, an indication of noise model type, an indication of a first anonymization parameter (e.g., expected distortion or expected guessing anonymity (privacy)) and a desired level (i.e., constraint) for the first anonymization parameter. Furthermore, the structured data to be anonymized is also provided to the noise parameter generation component 302. Based on the noise model type (e.g., Eqs. 3-6), the selection of the first anonymization parameter and its desired level determines what type of optimization problem will be solved by the component 302 to derive the noise parameter value. Note that, in practice, the various optimization problems for the different types of noise models are typically established ahead of time, although this is not a requirement. As noted previously, the optimization problem takes into account the actual values of the structured data when optimizing the noise parameter value, as illustrated by the structured data input to the noise parameter generation component 302.

Thus, if the first anonymization parameter is specified as expected distortion, the desired level is specified as a maximum level of distortion to be applied to the structured data, and the selected noise model type is used to establish an optimization problem in accordance with Equation 9. In this case, as noted above, optimization involves maximizing guessing anonymity (as a second anonymization parameter) over the available range of noise parameter values. Conversely, if the first anonymization parameter is specified as expected guessing anonymity, the desired level is specified as a minimum level of guessing anonymity required for the structured data, and the selected noise model type is used to establish an optimization problem in accordance with Equation 11. In this case, as noted above, optimization involves minimizing distortion (as the second anonymization parameter) over the available range of noise parameter values. Note that, regardless of which type of optimization problem is established based on the illustrated inputs, the noise parameter generation component 302 may employ conventional techniques, such as sequential quadratic programming, to solve the optimization problem. Generally, sequential quadratic programming techniques determine the best outcome (in the form of a maximized or minimized value) given constraints represented as inequalities. In the context of the instant disclosure, sequential quadratic programming techniques determine the best fit noise parameter value in accordance with either Equations 9 or 11. As known in the art, techniques other than sequential quadratic programming, including but not limited to other convex programming techniques and so-called greedy approximations may be equally employed for this purpose.

Referring now to FIG. 4, an apparatus 400 for anonymizing the structured data is shown. In particular, the apparatus comprises a noise generation component 402 in communication with an anonymizing component 404. An identification suppression component 406 and outlier modification component 408 are also in communication with the anonymizing component 404, as shown. The noise generation component 402 receives the noise parameter value as input and generates noise 410 as required by the selected noise model. For example, in the case of Gaussian perturbations to be applied across all records to corresponding ones of M different real quasi-identifiers, the noise parameter values would comprise M different variances, $\sigma_i^2$, for i=1 to M. Techniques for generating noise based on noise parameters, such as seeded pseudo-random noise generators, are well known in the art.

The resulting noise 410 is provided to the anonymizing component 404 where the noise 410 is used to perturb the quasi-identifiers, as defined above, in the structured data. The manner in which the noise 410 perturbs the structured data depends on the nature of the attributes. For example, for real valued attributes, the noise 410 may be added to the values whereas, for categorical attributes, the noise 410 may be used to specify transitions between various possible categorical values. With regard to the latter, the above-described probability matrix can be defined as conditional probabilities for each value. For example, for an attribute "marital status" conditional probabilities for the value married could be defined as: P(divorced|married)=0.1, P(married|married)=0.8 and P(widowed|married)=0.1. Upon choosing a noise value with uniform probability between 0 and 1, noise values less than 0.1 cause a transition to widowed and noise values greater than 0.9 cause a transition to divorced, whereas noise values between 0.1 and 0.9 (inclusive) result in no change, i.e., married to married. Regardless of the manner in which it is determined, the resulting noise perturbed data 416 is output by the anonymizing component 404 for further processing.

In one embodiment, prior to providing the structured data to the anonymizing component 404, it is first provided to an identification suppression component 406. The identification suppression component 406 will typically delete any identifiers in the structured data or, at the very least, modify the identifiers to such an extent that they are no longer able to identify a given individual. Although the identification suppression component 406 is illustrated as operating upon the structured data prior to anonymization, it is understood that the identification suppression component 406 could also be configured to operate upon the noise perturbed data 416.

Regardless, the noise perturbed data 416 may be optionally provided to an outlier modification module 408. Referring once again to the example illustrated in FIG. 7, despite the application of the noise to the quasi-identifiers (in this case, age), the value for the third record (49.3) is of such magnitude as to still render its corresponding record identifiable (i.e., it has a low guessing anonymity). To handle such cases, the modification applied outlier modification module 408 may comprise simply deleting those records including such outlier values. Alternatively, only the outlier values could be altered is such a way as to bring the value into a more reasonable range. For example, referring again to FIG. 7, the age for the third record could be decreased to bring it more in line with the other age values. The foregoing are but two examples of a wide variety of outlier modification strategies that could be employed as will be apparent to those of ordinary skill in the art. Because such modifications necessarily have a distorting effect on the utility of the underlying data, tolerance of the end user of the modified noise perturbed data to such distortions should be balanced against the desire to maintain certain minimum levels of privacy.

Figure 5:
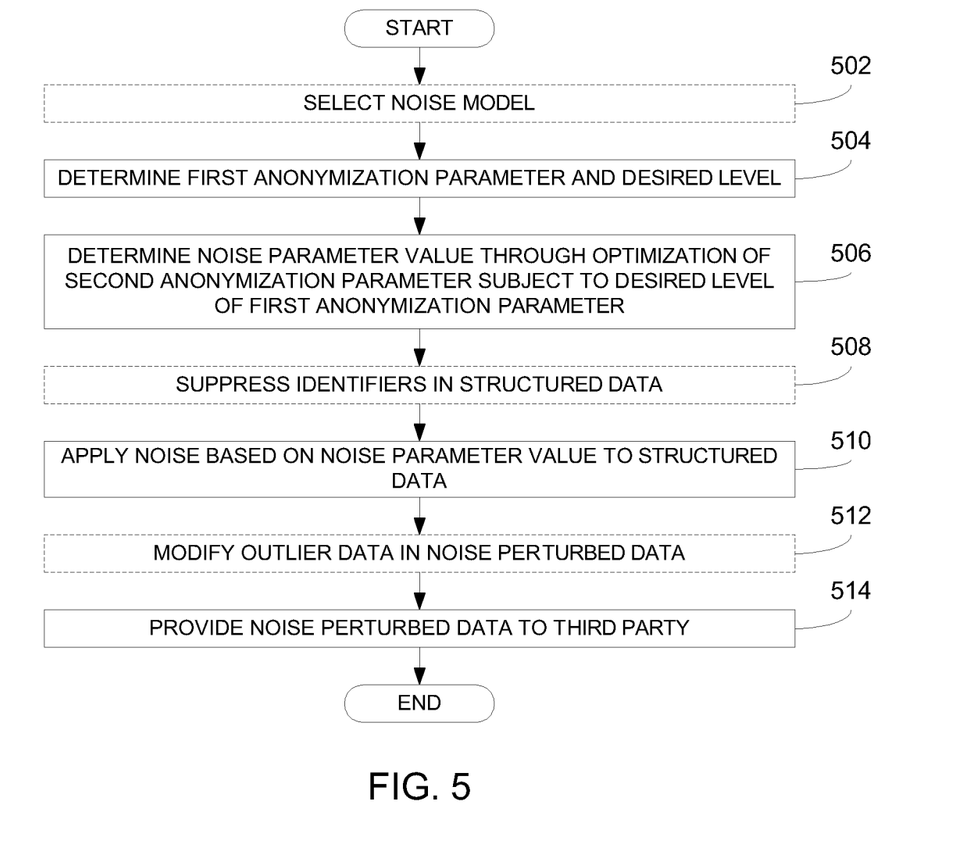
FIG. 5 is a flowchart illustrating processing in accordance with the teachings of the instant disclosure.

Referring now to FIG. 5, processing in accordance with the instant disclosure is further illustrated. Preferably, the processing illustrated in FIG. 5 is execute using any of the various devices/components illustrated in FIGS. 2-4. Beginning at block 502, selection of a noise model may optionally take place. As noted above, the particular type of noise model used dictates in part the nature of the optimization problem used to identify the noise parameter. Typically, the noise model is specified by a user using suitable input mechanisms. As part of specifying the noise model, the user specifies those attributes to be perturbed and the noise function(s) to be applied, e.g., separate Gaussians for each quasi-identifier across all records versus separate Gaussians for each quasi-identifier and for each value in each record. By providing this level of control, a user is able to explore various potential anonymization tradeoffs. Alternatively, or in addition, a default noise model may be specified.

Processing continues at block 504 where a first anonymization parameter is specified as well as a desired level for the first anonymization parameter. As noted above, in the context of randomization schemes, the first anonymization parameter may comprise either an expected distortion (in which case, the desired level is specified as a maximum expected distortion) or an expected guessing anonymity (in which case, the desired level is specified as a minimum expected guessing anonymity). By default, selection of the first anonymization parameter automatically sets the second anonymization parameter, i.e., selection of the expected distortion as the first anonymization parameter necessarily implies that guessing anonymity is the second anonymization parameter, whereas selection of the expected guessing anonymity as the first anonymization parameter necessarily implies that distortion is the second anonymization parameter. Thereafter, at block 506, the noise parameter value that optimizes the second anonymization parameter (either maximizes guessing anonymity or minimizes distortion) subject to the desired level of the first anonymization parameter is determined. As described above, this is accomplished through evaluation of the guessing inequality in the context of the indicated noise model such that the resulting boundary condition may be employed, along with the desired level as constraint, in the optimization problem. As optionally shown in block 508, identifiers in the structured data may be suppressed prior to anonymization of the structured data. However, as previously described, the suppression of identifiers may also be performed after anonymization since the processes (identifier suppression and quasi-identifier perturbation) operate on mutually exclusive subsets of data.

Thereafter, at block 510, noise based on the noise parameter value is generated and applied to the quasi-identifiers in the structured data. Any outlier data in the noise perturbed data may be optionally modified, at block 512, as described above to further enhance minimum guessing anonymity of the noise perturbed data. Finally, at block 514, the noise perturbed data (potentially with any outlier data values appropriately modified) is provided to a third party, such as a business or academic research organization, or any other entity interested in analyzing anonymized structured data.

As described above, the instant disclosure describes techniques for anonymizing structured data in a manner that tradeoffs between utility of the data (as reflected by data distortion) versus privacy may be more precisely controlled. This is achieved through the establishment of optimization problems in which one of the anonymization parameters is constrained while another is optimized over a range of noise model parameter values. Creation of such optimization problems is realized through characterization of privacy as a function of guessing anonymity and the application of the guessing inequality to establish the analytical connection between noise model parameters and privacy. For at least these reasons, the above-described techniques represent an advancement over prior art teachings.

While particular preferred embodiments have been shown and described, those skilled in the art will appreciate that changes and modifications may be made without departing from the instant teachings. For example, in the case where separate noise models are used for separate attributes (whether real or categorical), varying levels of anonymization may be applied such that, for example, a first attribute is only moderately perturbed whereas a second, potentially more sensitive attribute is more heavily perturbed. More complex noise models, such as dependent Gaussian noise models, may also be employed.

Furthermore, the techniques described above have centered on the use of structured data, e.g., tables or databases of values organized according to various attributes or categories. However, the instant disclosure is not limited in this regard. That is, the anonymization techniques described above may be equally applied to unstructured data, such as electronically-represented, natural language documents. In this embodiment, various types of processing may be applied to the data prior to applying the above-described anonymization techniques. For example, so-called classification techniques may be applied to the (unstructured) data to extract any attributes and values in the data. Techniques for extracting attributes and values using classification algorithms are well known in the art including, but not limited to, those techniques described in U.S. Patent Application Publication No. 2007/0282892 commonly owned by the assignee of the instant application. Alternatively, other commonly used approaches for attribute/value extraction, such as so-called information gain or chi-square techniques, can be used to select a subset of key words in documents. Further still, each word in a document could be treated as an attribute with anonymization, as described above, proceeding on that basis. Once attributes and any corresponding values are identified, the various type of attributes, e.g., identifiers, quasi-identifiers or confidential, are identified. In an embodiment, such information may be identified through the use of metadata of a given document. For example, an identifier attribute may be identified where the metadata includes the name of a company referred to in the document. Alternatively, lists of specific attribute values may indicate whether a corresponding attribute should be considered as an identifier (e.g., capitalized words, noun phrases including indicia of personal identification (such as "Mr.", "Ms.", "Inc.", "Co."), etc.), as a quasi-identifier (e.g., age indications, gender indications, zip codes, etc.) or as confidential (e.g., medical procedure codes, currency amounts, etc.). Regardless, having identified the identifiers and quasi-identifiers, the techniques described above may be employed to appropriately anonymized the quasi-identifier values directly within the data, e.g., within the natural language document. Alternatively, the unstructured data could be converted into a more structured form prior to anonymization.

It is therefore contemplated that any and all modifications, variations or equivalents of the above-described teachings fall within the scope of the basic underlying principles disclosed above and claimed herein.

What is claimed is:

1. A method, implemented by a processing device, to perform anonymization of data through an application of noise to the data, the anonymization assessed according to a first anonymization parameter and a second anonymization parameter, the method comprising:
    determining, by the processing device, a desired level for the first anonymization parameter,
        the first anonymization parameter relating to privacy, and
        the desired level relating to a minimum privacy;
    determining, by the processing device, a range of noise parameter values constrained by the desired level for the first anonymization parameter;
    determining, by the processing device and from the range of noise parameter values, a value for a noise parameter of a noise model that optimizes the second anonymization parameter,
        the second anonymization parameter relating to distortion;
    applying, by the processing device, noise, generated by the noise model based on the determined value of the noise parameter, to the data to provide noise perturbed data,
        the noise, when applied to the data, ensuring anonymization performance, according to the first anonymization parameter, that satisfies the desired level; and
    providing, by the processing device, the noise perturbed data to another processing device.

2. The method of claim 1, wherein optimization of the second anonymization parameter comprises minimizing a distortion subject to the minimum privacy.

3. The method of claim 1, wherein applying the noise further comprises:
    applying the noise to at least one quasi-identifier in the data.

4. The method of claim 1,
    wherein the other processing device is associated with a third party.

5. The method of claim 4, further comprising:
    modifying outlier data in the noise perturbed data prior to providing the noise perturbed data to the third party.

6. The method of claim 1, further comprising:
    suppressing identifiers in the data.

7. The method of claim 1, wherein the noise model is applicable to real attributes in the data.

8. The method of claim 1, wherein the noise model is applicable to categorical attributes in the data.

9. An apparatus for anonymizing data through an application of noise to the data, the anonymization assessed according to a first anonymization parameter and a second anonymization parameter, the apparatus comprising:

a memory to store instructions; and at least one processor to execute the stored instructions to determine a desired level for the first anonymization parameter, the first anonymization parameter relating to privacy, and the desired level relating to a minimum privacy;

determine a range of noise parameter values constrained by the desired level for the first anonymization parameter;

determine, from the range of noise parameter values, a value for a noise parameter of a noise model that optimizes the second anonymization parameter, the second anonymization parameter relating to distortion;

apply noise, generated by the noise model based on the determined value of the noise parameter, to the data to provide noise perturbed data, the noise, when applied to the data, ensuring anonymization performance according to the first anonymization parameter, that satisfies the desired level; and provide the noise perturbed data to at least one other processor.

10. The apparatus of claim 9, wherein the at least one processor, when determining the value for the noise parameter, is further to:

optimize the second anonymization parameter by minimizing a distortion subject to the minimum privacy.

11. The apparatus of claim 9, wherein the at least one processor, when applying the noise to the data, is further to:

apply the noise to at least one quasi-identifier in the data.

12. The apparatus of claim 9, wherein the wherein the at least one other processor is associated with a third party.

13. The apparatus of claim 12, wherein the at least one processor is further to:

modify outlier data in the noise perturbed data prior to providing the noise perturbed data to the third party.

14. The apparatus of claim 9, wherein the at least one processor is further to:

suppress identifiers in the data.

15. The apparatus of claim 9, wherein the noise model is applicable to real attributes in the data.

16. The apparatus of claim 9, wherein the noise model is applicable to categorical attributes in the data.

17. A non-transitory computer readable medium storing instructions, the instructions comprising:

one or more instructions which, when executed by at least one processor, cause the at least one processor to:

determine a desired level for a first anonymization parameter, the first anonymization parameter relating to privacy, and the desired level relating to a minimum privacy;

determine a range of noise parameter values constrained by the desired level for the first anonymization parameter;

determine, from the range of noise parameter values, a value for a noise parameter of a noise model that optimizes a second anonymization parameter, the second anonymization parameter relating to distortion;

apply noise, generated by the noise model based on the determined value of the noise parameter, to data to provide noise perturbed data, the noise, when applied to the data, ensuring anonymization performance according to the first anonymization parameter, that satisfies the desired level; and provide the noise perturbed data to at least one other processor.

18. The non-transitory computer readable medium of claim 17, wherein the one or more instructions to determine the value for the noise parameter include:

one or more instructions to optimize the second anonymization parameter by minimizing a distortion subject to the minimum privacy.

19. The non-transitory computer readable medium of claim 17, wherein the one or more instructions to apply the noise to the data include:

one or more instructions to apply the noise to at least one quasi-identifier in the data.

20. The non-transitory computer readable medium of claim 17, wherein the at least one other processor is associated with a third party.

21. The non-transitory computer readable medium of claim 17, wherein the instructions further comprise:

one or more instructions to modify outlier data in the noise perturbed data prior to providing the noise perturbed data to the third party.

22. The non-transitory computer readable medium of claim 17, wherein the instructions further comprise:

one or more instructions to suppress identifiers in the data.

23. The non-transitory computer readable medium of claim 17, wherein the noise model is applicable to real attributes in the data.

24. The non-transitory computer readable medium of claim 17, wherein the noise model is applicable to categorical attributes in the data.

* * * * *

UNITED STATES PATENT AND TRADEMARK OFFICE
CERTIFICATE OF CORRECTION

PATENT NO. : 8,627,483 B2
APPLICATION NO. : 12/338483
DATED : January 7, 2014
INVENTOR(S) : Yaron Rachlin et al.

It is certified that error appears in the above-identified patent and that said Letters Patent is hereby corrected as shown below:

In the Claims

Please correct Claim 12 (Column 15, Line 34) to read as follows:

the at least one other processor is associated with

Signed and Sealed this
Seventeenth Day of June, 2014

Michelle K. Lee
*Deputy Director of the United States Patent and Trademark Office*